Figure 1:
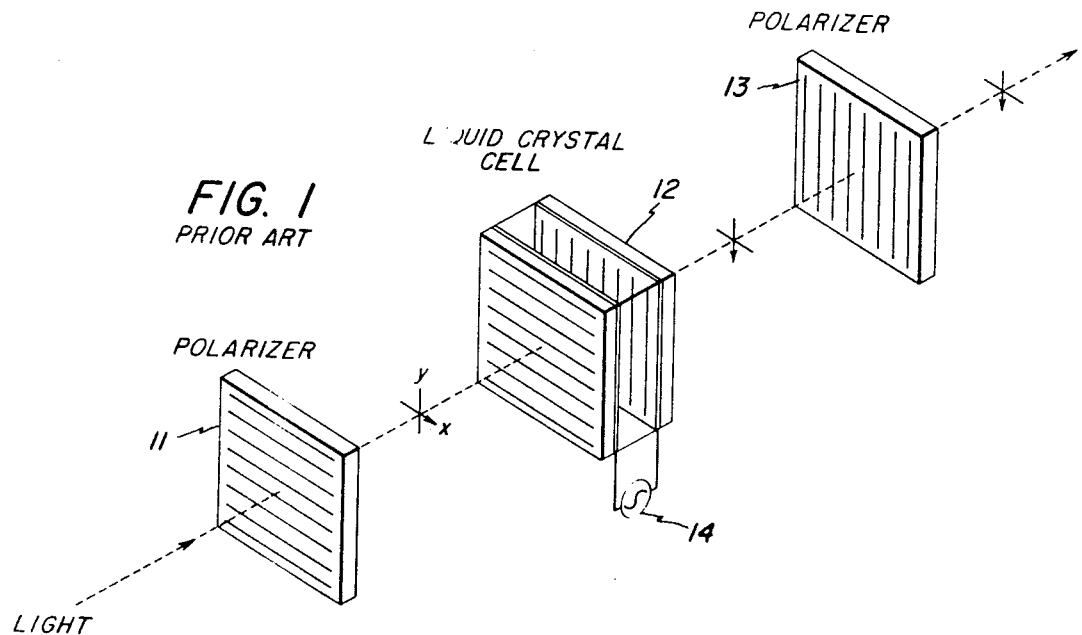

United States Patent [19]
Bigelow

[11] 3,784,280
[45] Jan. 8, 1974

[54] LIGHT-DARK REFLECTIVE LIQUID CRYSTAL DISPLAY

[75] Inventor: John E. Bigelow, Clifton Park, N.Y.

[73] Assignee: General Electric Company, Schenectady, N.Y.

[22] Filed: Jan. 2, 1973

[21] Appl. No.: 320,466

[52] U.S. Cl............................ 350/150, 350/160 LC
[51] Int. Cl.............................................. G02f 1/16
[58] Field of Search...................... 350/150, 160 LC

[56] References Cited
UNITED STATES PATENTS
3,694,053 9/1972 Kahn.................................. 350/150
3,731,986 5/1973 Ferguson........................350/150

Primary Examiner—Edward S. Bauer
Attorney—Paul F. Wille, Joseph I. Cohen and Jerome C. Squellaro

[57] ABSTRACT

Described are light-dark contrasting displays comprising a liquid crystal cell including a nematic liquid crystal composition with a positive dielectric anisotropy having mutually parallel molecular alignment at opposing planar surfaces of the cell, an optical polarizer positioned on one side of the cell and an optically reflecting member on the other side of the cell. Light-dark images are produced by controllably altering the molecular alignment of the liquid crystal composition in selected regions.

5 Claims, 2 Drawing Figures

PATENTED JAN 8 1974   3,784,280

LIGHT-DARK REFLECTIVE LIQUID CRYSTAL DISPLAY

The present invention relates to display devices and more particularly to liquid crystal display devices providing light-dark contrasting images.

Liquid crystal display devices generally utilize the dynamic scattering properties of a nematic liquid crystal composition to produce various displays. These display devices rely on an orientational ordering of molecular axes in a quiescent condition to produce a substantially transparent condition and a partially randomized alignment of these molecules in an activated condition to produce a substantially opaque or frosted condition, thereby producing a contrasting display. While these displays are quite satisfactory for many applications, it is desirable to provide liquid crystal displays with a higher degree of contrast than is available with dynamic scattering type displays.

It is therefore an object of this invention to provide a light-dark contrasting display which exhibits higher contrast ratios than dynamic scattering type displays.

It is a further object of this invention to provide a display device employing a liquid crystal orientation controlling effect dependent upon an electric field.

It is another object of this invention to provide a liquid crystal display device having lower current requirements and providing a longer life than dynamic scattering type displays.

It is a further object of this invention to provide a display device enjoying the high contrast possible with field effects while having the ease of fabrication of the dynamic scattering type display devices.

It is still a further object of this invention to provide a reflective type liquid crystal display in which the intensity of light reflection is controlled by an electric field.

Briefly, these and other objects of my invention are achieved in accord with one embodiment thereof wherein a reflective liquid crystal display is provided with a light-dark contrasting image by employing a liquid crystal cell containing a nematic liquid crystal composition of a positive dielectric anisotropy and mutually parallel molecular alignment at opposing planar surfaces of the cell. An optical polarizer is positioned on one side of the liquid crystal cell and an optically reflecting member is positioned on the other side of the cell. Unpolarized light incident on the optical polarizer is polarized at a 45° angle before entering the liquid crystal cell. As will be described more fully below, the thickness of the liquid crystal cell is adjusted to provide a quarter wavelength relative retardation of the polarized light entering the liquid crystal cell at a 45° angle. The light exiting the liquid crystal cell is circularly polarized and after reflection from the optical reflecting member re-enters the liquid crystal cell with the sense of rotation reversed by the reflecting member. The polarization of the light exiting the liquid crystal cell is crossed with respect to the polarization of the polarizer and hence there is complete extinction and a resulting dark surface appearing on the polarizer. A light region is produced from the liquid crystal display by changing the molecular orientation of the liquid crystal composition such that alignment of the molecules is in a direction substantially orthogonal to the opposing surfaces of the planar cell walls. Under these conditions, the polarized light exiting from the polarizer passes through the liquid crystal cell and is reflected back through the cell with no polar rotation so that a light region is produced at the viewing surface of the polarizer. Those skilled in the art can readily appreciate that by providing means for controllably altering the molecular alignment of the liquid crystal composition in selected regions, light-dark contrasting images are readily displayed at the viewing surface of the polarizer.

Figure 2:
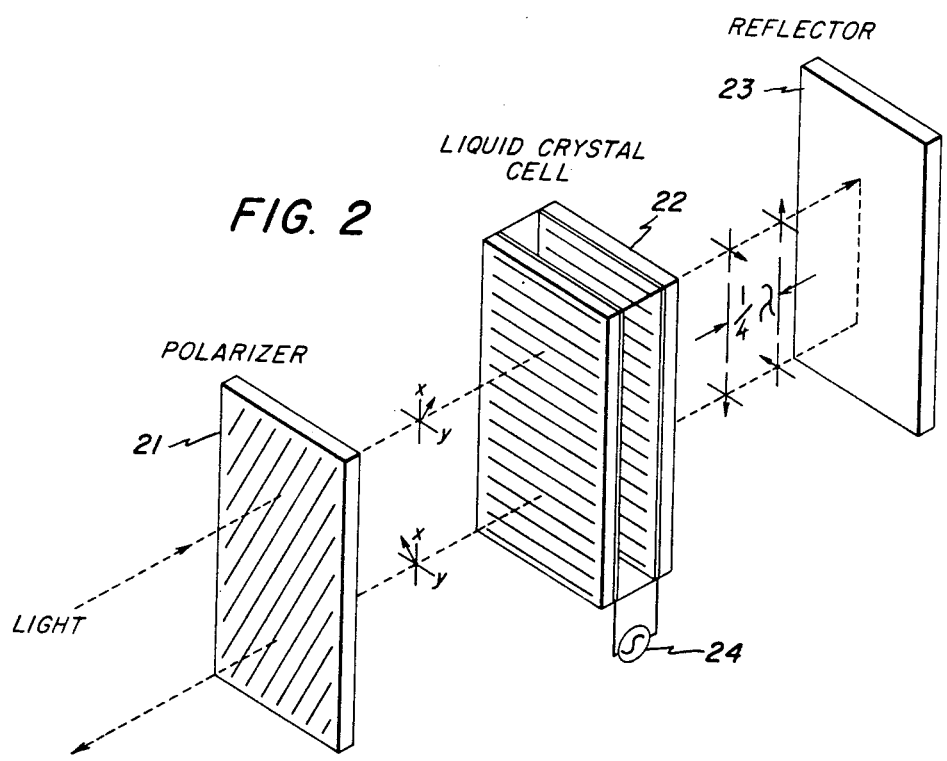

A better understanding of my invention as well as other objects and further advantages thereof will become more apparent to those skilled in the art from the following detailed description taken in connection with the accompanying drawings in which:

FIG. 1 is a typical light-dark display constructed in accord with the prior art; and FIG. 2 is an embodiment of the present invention for providing a light-dark contrasting display.

FIG. 1 illustrates a light-dark display constructed in accord with the prior art. This display utilizes a polarizer 11 which passes only horizontally polarized light. The horizontally polarized light is directed to a liquid crystal cell 12 containing a liquid crystal composition having a horizontal molecular alignment along one surface and a vertical molecular alignment along the opposing surface. The horizontally polarized light entering the first surface of the liquid crystal cell is rotated or twisted through 90° in the same manner in which the liquid crystal composition is twisted. The light exiting from the liquid crystal cell 12 is hence vertically polarized and passes through a polarizer 13 as a vertically polarized light wave. By the application of an electric field to the conductive surfaces of the liquid crystal cell 12, the molecular orientation of the liquid crystal composition is rotated to become orthogonal to the cell walls so no rotation of polarization occurs. Hence, transmission through the cell and subsequent polarizer 13 is impeded and a light-dark display is provided at the output of the polarizer 13.

One of the difficulties in making a light-dark display in accord with the prior art device illustrated in FIG. 1 is the liquid crystal cell 12 with the desired molecular orientation of the liquid crystal composition. More specifically, it is extremely difficult to fabricate liquid crystal cells if the molecular alignment is at 90° on opposing surfaces of the liquid crystal cell. As will become more apparent from the description of my invention, this difficulty is obviated by the use of a liquid crystal cell with a single direction of molecular orientation.

In accord with one embodiment of my invention, as illustrated in FIG. 2, a light-dark contrasting display comprises a polarizer 21 with the plane of polarization at 45° with respect to the horizontal. The polarizer 21 is positioned on one side of a liquid crystal cell 22 containing a nematic liquid crystal composition having a positive dielectric anisotropy and a molecular alignment parallel to one of the longitudinal dimensions of the cell. As illustrated in FIG. 2, the molecular alignment is parallel to the horizontal dimension of the cell. On the other side of the liquid crystal cell is a reflecting member 23 such as that provided by a metal film deposited on a separate glass substrate or by a metal film deposited on the surface of the rear plate of the liquid crystal cell.

Operationally, unpolarized light incident on the polarizer 21 is polarized at a 45° angle with respect to the X and Y axes illustrated in the drawing. The polarized light then enters the liquid crystal cell 22 having a thickness which produces a one-quarter wavelength relative retardation of the X and Y components of the incident polarized light so that the light exiting from the liquid crystal cell is circularly polarized. The circularly polarized light is then reflected from the reflecting surface 23 back to the liquid crystal cell 22. For purposes of clarity, the reflected beam is illustrated in FIG. 2 as being displaced from the incident beam. However, as illustrated in the drawing, the reflected beam has its sense of direction reversed from that of the incident beam. Upon passing through the liquid crystal cell 22, an additional quarter wavelength of retardation results and hence the light beam incident on the polarizer 21 is crossed with respect to the polarization of polarizer 21. Hence, no light exits from the polarizer 21 and the surface of the polarizer appears dark.

A contrasting image with light and dark regions is produced by applying an electric field to the conductive surfaces of the liquid crystal cell 22 from the voltage source 24 so that the molecular orientation of the liquid crystal composition is orthogonal to the cell walls. With the application of an electric field, there is no polar rotation of light and hence light passes through the polarizer 21 with a theoretical transmission efficiency of approximately 50 per cent. Those skilled in the art can readily appreciate that by applying the electric field to selected regions of the liquid crystal composition, the molecular orientation of the liquid crystal composition is altered in only those regions. Hence, a light and dark contrasting display is provided at the surface of the polarizer 21.

Those skilled in the art can also appreciate that the light and dark regions of the display are readily reversed by the use of a quarter wave plate on either side of the liquid crystal cell 22. Whereas the display device without the quarter wave plate exhibits one-quarter wavelength retardation without an electric field and no retardation with an electric field, the display device with the quarter wave plate exhibits one-half wavelength retardation without an electric field and one-quarter wavelength retardation with an electric field. However, the one-half and zero wavelengths retardation are optically the same, hence the use of a quarter wave plate merely reverses the light and dark regions of the display.

From the foregoing description, those skilled in the art can readily appreciate the numerous advantages flowing from my invention. For example, the light-dark display constructed in accord with my invention requires only a single polarizer and a liquid crystal cell with a reflecting member which may be provided by a reflective surface on the back wall of the liquid crystal cell 22. In contrast, the prior art display illustrated in FIG. 1 requires two polarizers with a liquid crystal cell having orthogonally oriented surfaces to produce a light and dark display. Further, whereas the prior art display is of the transmissive type, my invention relates to a reflective liquid crystal display. While it is possible to alter the prior art display by providing a reflecting member at the output of the polarizer 13, such a modification would still require the use of two polarizers and a liquid crystal cell with the orthogonally oriented liquid crystal composition. One of the primary advantages of utilizing only a single polarizer is that polarizers transmit only about 75 per cent of the parallel polarized light impinging on their surface. Hence, by the use of only a single polarizer with light passing therethrough only once in each direction, as opposed to the prior art display requiring two polarizers, the light absorption due to passage through the polarizers is substantially reduced. This reduction in light absorption increases the intensity of the image displayed on the viewing polarizer.

Another advantage of my invention over the prior art display is the use of a liquid crystal cell with only a single direction of molecular orientation for the liquid crystal composition as opposed to the orthogonal orientation employed by the prior art. As pointed out above, the orthogonal orientation is extremely difficult to fabricate whereas the parallel arrangement described with reference to FIG. 2 is easily fabricated.

Those skilled in the art can appreciate that numerous nematic liquid crystal compositions of positive dielectric anisotropy may be used in practicing my invention. Examples of useful compositions are described in copending application Ser. No. 293,328 filed Sept. 29, 1972, and of common assignee as the instant application.

In summary, my invention provides electric field control of the intensity of reflected light with a single polarizer, liquid crystal cell and a reflecting surface. My invention provides light-dark contrasting images which are preferable to the scatter-specular contrast of the prior art while requiring lower current operation and hence longer life than dynamic scattering displays of the prior art.

Those skilled in the art can readily appreciate that numerous modifications and variations of my invention are possible. It is therefore to be understood that changes may be made in the particular embodiments of my invention which fall within the full intended scope of the invention as defined by the appended claims.

What I claim as new and desire to secure by Letters Patent of the Untited States is:

1. A reflective liquid crystal display providing a light-dark contrasting display, said display comprising:
   a liquid crystal cell, said cell containing a nematic liquid crystal composition having a positive dielectric anisotropy and mutually parallel molecular alignment at opposing planar surfaces of said cell;
   an optical polarizer positioned on one side of said cell;
   an optically reflecting member positioned on the other side of said cell; and
   means for altering the molecular alignment of the liquid crystal composition in selected regions for producing a light-dark display.

2. The display of claim 1 wherein said optical reflecting member comprises a reflective surface coating applied to one surface of said liquid crystal cell.

3. The display of claim 1 wherein said means for altering the molecular alignment of said liquid crystal composition comprises a source of electric potential for applying an electric field to said liquid crystal composition.

4. The display of claim 1 wherein said liquid crystal cell retards one component of light impinging thereon with respect to the orthogonal component of light by 90° thereby producing circularly polarized light at its output.

5. The display of claim 1 wherein said optical polarizer has an orientation which polarizes light impinging thereon at a 45° angle with respect to the molecular alignment of said liquid crystal composition in the absence of an electric field.

* * * * *